(12) United States Patent
Parikh et al.

(10) Patent No.: US 7,412,646 B2
(45) Date of Patent: Aug. 12, 2008

(54) SYSTEMS AND METHODS FOR PAGINATION AND CO-PAGINATION

(75) Inventors: Sujal S. Parikh, Redmond, WA (US); Grzegorz Zygmunt, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 10/692,111

(22) Filed: Oct. 23, 2003

(65) Prior Publication Data

US 2005/0091585 A1  Apr. 28, 2005

(51) Int. Cl.
*G06F 17/00* (2006.01)
(52) U.S. Cl. ...................... 715/251; 715/273
(58) Field of Classification Search ............. 715/517, 715/525, 251, 273
See application file for complete search history.

(56) References Cited

U.S. PATENT DOCUMENTS

| | | | |
|---|---|---|---|
| 4,495,490 A | 1/1985 | Hopper et al. | |
| 5,390,354 A * | 2/1995 | de Heus et al. | 715/517 |
| 5,450,536 A | 9/1995 | Rosenberg et al. | |
| 5,495,561 A * | 2/1996 | Holt | 358/1.15 |
| 5,838,317 A | 11/1998 | Bolnick et al. | |
| 5,873,106 A * | 2/1999 | Joseph | 715/506 |
| 5,903,903 A | 5/1999 | Kennedy | |
| 6,043,817 A | 3/2000 | Bolnick et al. | |
| 6,128,633 A | 10/2000 | Michelman et al. | |
| 6,175,845 B1 * | 1/2001 | Smith et al. | 715/525 |
| 6,268,924 B1 | 7/2001 | Koppolu et al. | |
| 6,415,305 B1 | 7/2002 | Agrawal et al. | |
| 6,626,955 B1 | 9/2003 | Agrawal et al. | |
| 6,738,152 B1 * | 5/2004 | Roth et al. | 358/1.14 |
| 2003/0079177 A1 | 4/2003 | Brientzenhofe et al. | |
| 2003/0217061 A1 * | 11/2003 | Agassi et al. | 707/10 |
| 2005/0162694 A1 * | 7/2005 | Chiba et al. | 358/1.15 |

OTHER PUBLICATIONS

Furuta, Richard, et al, "Document Formatting Systems: Survey, Concepts, and Issues", ACM Computing Surveys (CSUR), vol. 14, Issue 3, Sep. 1982, pp. 417-472.*
Probets, Steve, et al, "Hypermedia and Graphics 2: Vector Graphics: From PostScript and Flash to SVG", Proceedings of the 2001 ACM Symposium on Document Engineering, Nov. 2001, pp. 135-143.*
Mueller, John Paul, Visual C#.NET Developer's Handbook, Sybex Inc., 2002, downloaded from http://www.sfu.ca/~alirezan/Ebooks/New%20folder/Sybex%20-%20Visual%20C%20Sharp%20.NET%20Developers%20Handbook.pdf, pp. 1-5, 10-12, 67-71, 89-90, and 333-335.*

* cited by examiner

*Primary Examiner*—Laurie Ries
(74) *Attorney, Agent, or Firm*—Merchant & Gould; Christopher J. Leonard

(57) ABSTRACT

Methods and systems are provided for controlling pagination in computer software applications. Abstract classes and methods are provided with programming interfaces to improve the ease with which developers can create applications that allow for co-pagination with arbitrary object types, and can create arbitrary object types that can co-paginate with arbitrary applications.

7 Claims, 18 Drawing Sheets

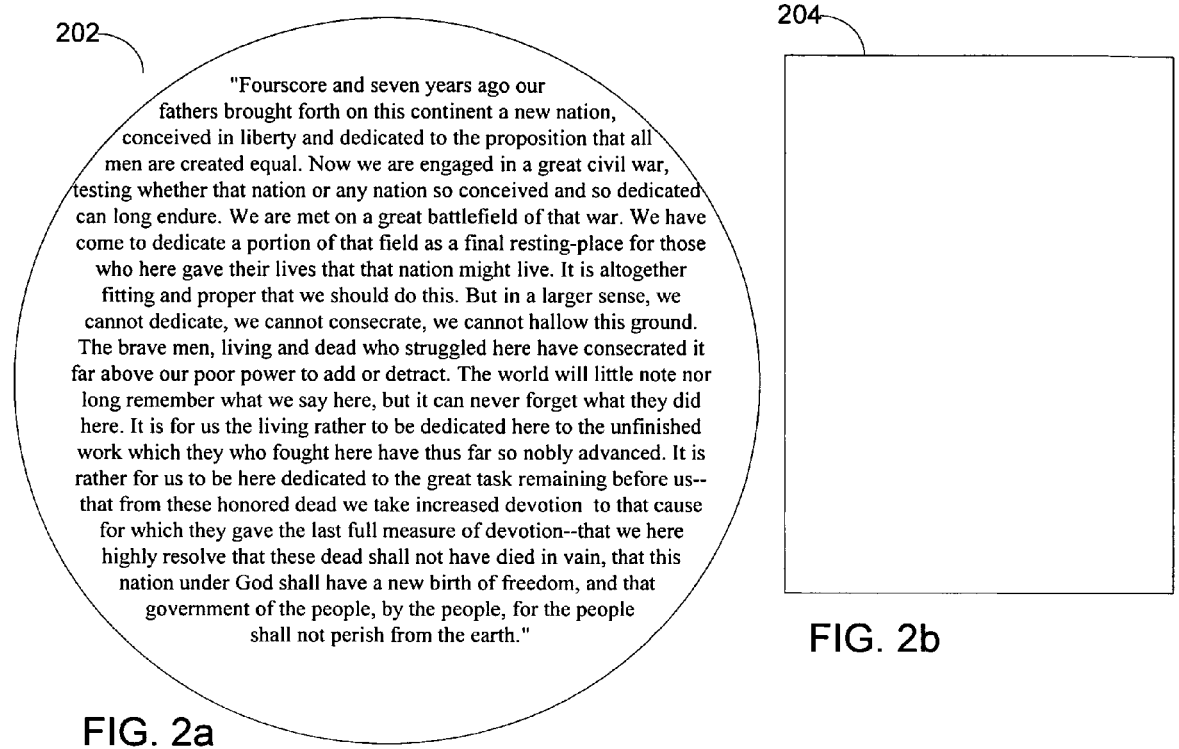
FIG. 2a
FIG. 2b
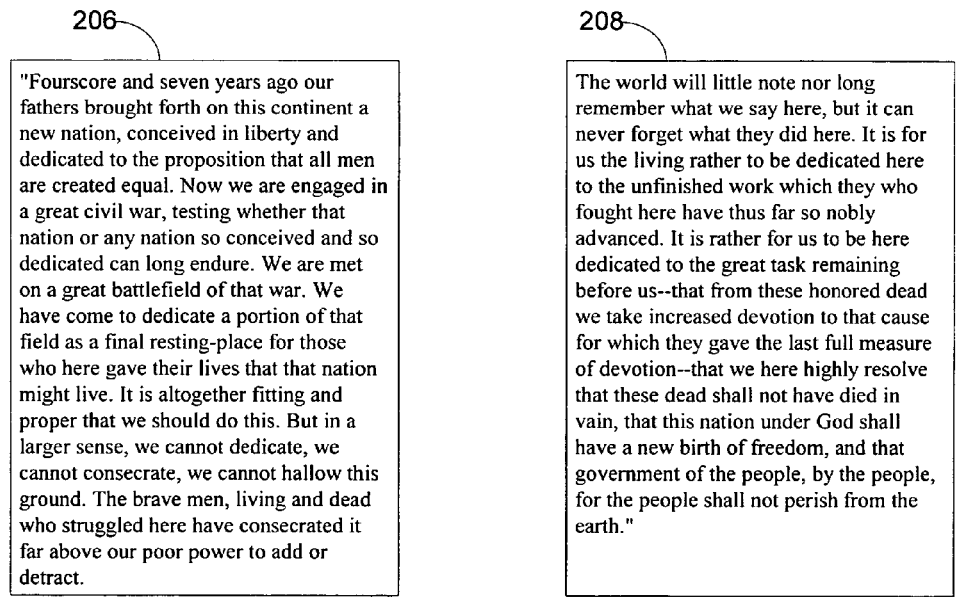
FIG. 2c

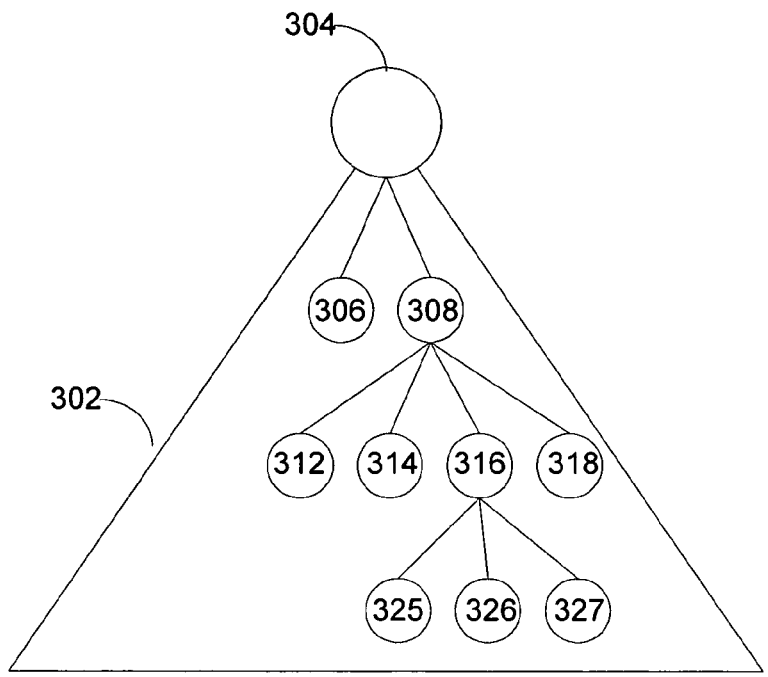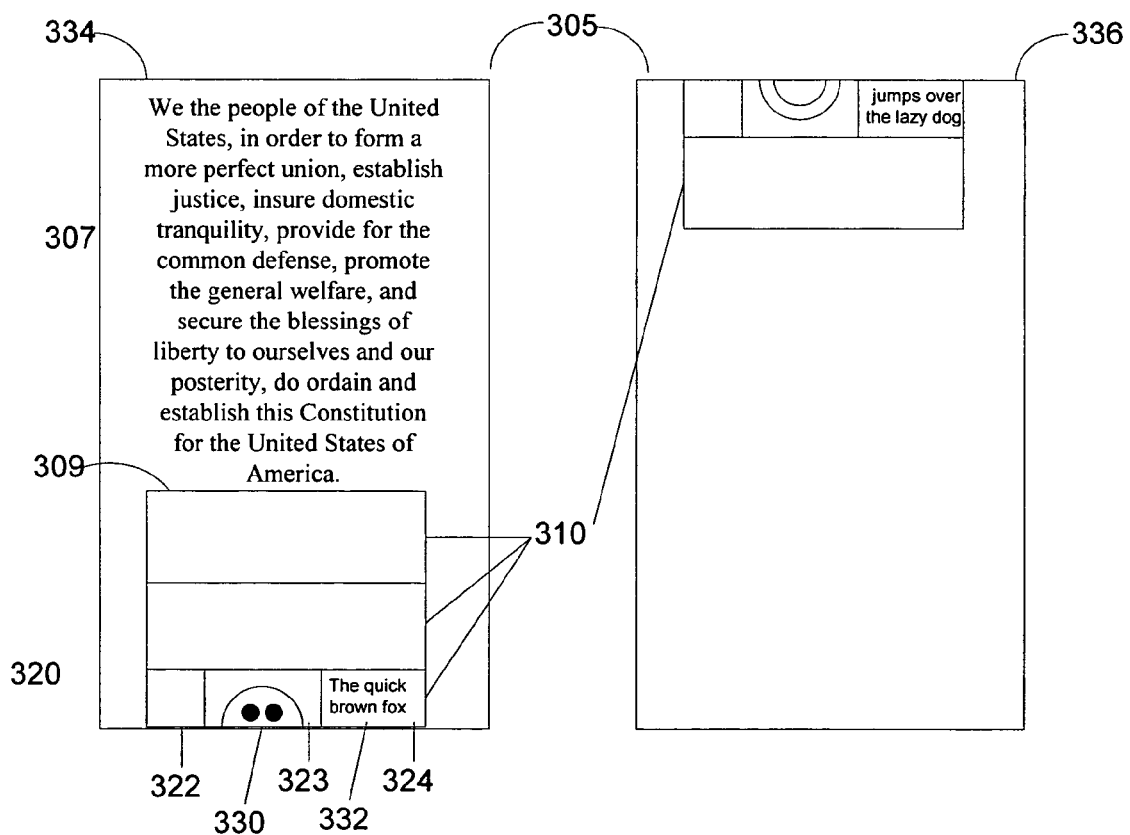
FIG. 3

```
interface IDocumentContentHost
{
  /// <summary>
  /// Invoked on the host by one of its children (IDocumentFormatter
  /// object), when content is changing. The host needs to reformat
  /// at least part of its content to reflect changes on the child.
  /// </summary>
  /// <param name="child">Child which has been changed.</param>
  /// <param name="changeStart">Start position of a change.</param>
  /// <param name="changeEnd">End position of a change.</param>
  void OnContentChanged(
    IDocumentFormatter child,
    ContentPosition changeStart,
    ContentPosition changeEnd);

/// <summary>
  /// Invoked on the host by one of its children (IDocumentFormatter
  /// object) when content is changing. The host needs to reformat
  /// at least part of its content to reflect changes on the child.
  /// Assume that entire child has been changed.
  /// </summary>
  /// <param name="child">Child which has been changed.</param>
  void OnContentChanged(
    IDocumentFormatter child);

/// <summary>
  /// Invoked on the host by one of its children (IDocumentFormatter
  /// object) when content has explicit page size requirement, which
  /// is not matching the current page size (in PageDescriptor).
  /// </summary>
  /// <param name="child">Child which requires new page size.</param>
  /// <param name="pageSize">Page size.</param>
  void OnPageSizeMismatch(
    IDocumentFormatter child,
    Size pageSize);
}
```

FIG. 8

```
interface IDocumentFormatter
{
  /// <summary>
  /// Creates and formats a new document page.
  /// Throws exception if host is not set.
  /// </summary>
  /// <param name="constraint">Size constraint for the page.</param>
  /// <param name="pageDescriptor">Page descriptor; always required.
  /// For bottomless scenarios height is always = ∞.</param>
  /// <returns>An object representing formatted page.</returns>
  DocumentPage MeasurePage(
     Size constraint,
     PageDescriptor pageDescriptor);

/// <summary>
  /// Update existing document page.
  /// Throws exception if host is not set.
  /// </summary>
  /// <param name="page">DocumentPage to update.</param>
  /// <param name="constraint">Size constraint for the page.</param>
  /// <param name="pageDescriptor">PageDescriptor; always required.
  /// For bottomless scenarios height is always = ∞.</param>
  void UpdatePage(
     DocumentPage page,
     Size constraint,
     PageDescriptor pageDescriptor);

/// <summary>
  /// Arranges existing document page.
  /// Throws exception if host is not set.
  /// </summary>
  /// <param name="page">DocumentPage to arrange.</param>
  /// <param name="arrangeSize">Desired size of the page.</param>
  void ArrangePage(
     DocumentPage page,
     Size arrangeSize);

/// <summary>
  /// Calculates only break record for the document page.
  /// Throws exception if host is not set.
  /// </summary>
  /// <param name="constraint">Size constraint for the page.</param>
  /// <param name="pageDescriptor">Page descriptor.</param>
  /// <returns>Page break record.</returns>
  BreakRecord CalculateBreakRecord(
     Size constraint,
     PageDescriptor pageDescriptor);

/// <summary>
  /// Set the host of the document control.
  /// </summary>
  /// <param name="host">Host object, which receives notifications
  /// about content changes.</param>
  void SetDocumentContentHost(
     IDocumentContentHost host);
}
```

FIG. 9

```
abstract class DocumentPage
{
  /// <summary>
  /// Object which DocumentPage is representing.
  /// </summary>
  Object Owner { get; }

/// <summary>
  /// Desired size of the page.
  /// </summary>
  Size DesiredSize { get; }

/// <summary>
  /// Computed size of the page.
  /// </summary>
  Size ComputedSize ( get; )

/// <summary>
  /// BreakRecord indicating break position of the page.
  /// 'null' if the page is bottomless or it is the last page.
  /// </summary>
  BreakRecord BreakRecordOut { get; }

/// <summary>
  /// RenderableEntity node representing content of the page.
  /// </summary>
  RenderableEntity RenderEnt { get; }

/* Detailed interface for document related features
  /* (footnotes, pagenotes, etc.) to be provided
}
```

FIG. 10a

```
sealed class PageDescriptor
{
  PageDescriptor(
    Size pageSize,
    BreakRecord breakRecordIn);

/// <summary>
  /// Size of the document page (top-level page).
  /// </summary>
  Size PageSize { get; }

/// <summary>
  /// BreakRecord of the previous page. Necessary to continue
  /// page formatting.
  /// </summary>
  BreakRecord BreakRecordIn { get; }
}
```

FIG. 10b

```
abstract class BreakRecord : IComparable
{
  /// <summary>
  /// Determines if the break record is invalidated by specified
  /// dirty text range (DTR).
  /// </summary>
  /// <param name="changeStart">Start position of a change.</param>
  /// <param name="changeEnd">End position of a change.</param>
  /// <returns>'true' if is invalid, 'false' otherwise.</returns>
  bool IsInvalid(
    ContentPosition changeStart,
    ContentPosition changeEnd);

/// <summary>
  /// Content break position. If content breaks in more than one
  /// place, this position points to further most break position.
  /// </summary>
  ContentPosition BreakPosition { get; }
}
```

FIG. 11a

```
abstract class ContentPosition : IComparable
{
  /// <summary>
  /// Return true if this instance can be compared to the passed
  /// position.
  /// </summary>
  public abstract bool IsComparableTo(
    ContentPosition position);
}
```

FIG. 11b

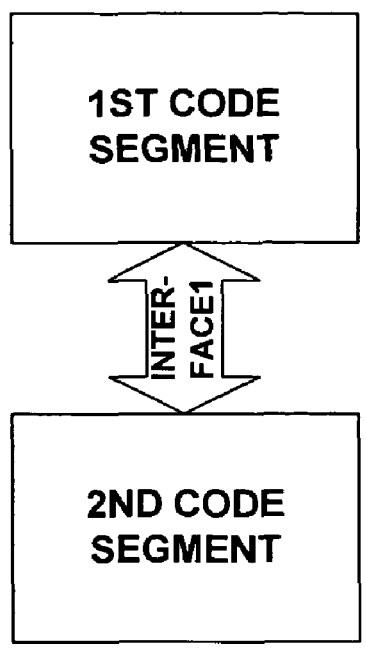
FIGURE A1
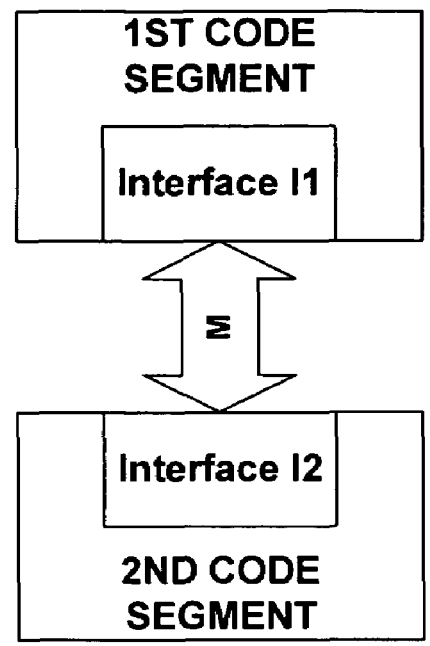
FIGURE A2
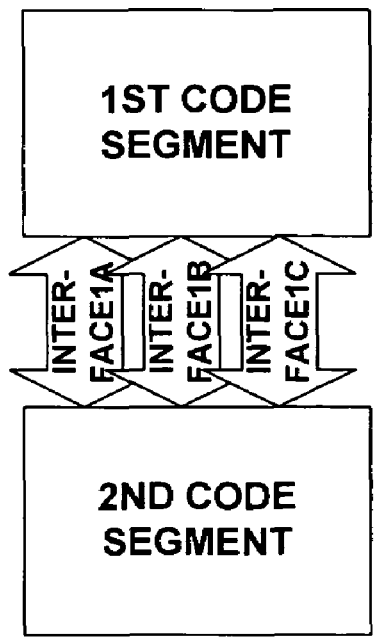
FIGURE B1
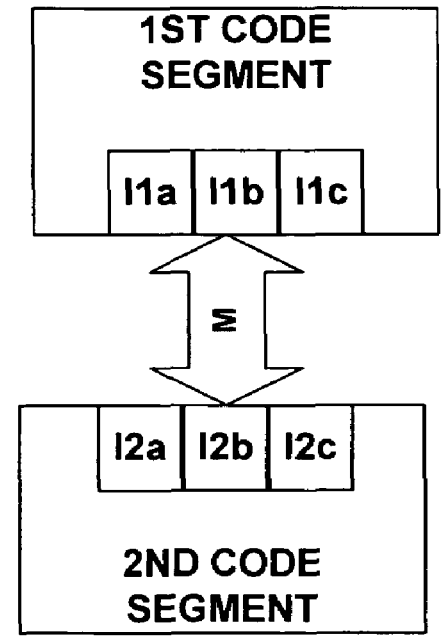
FIGURE B2

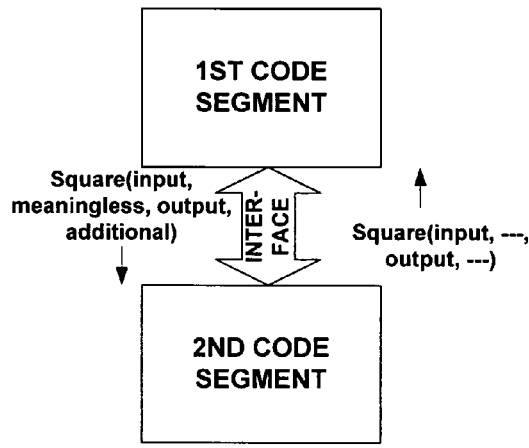
FIGURE C1
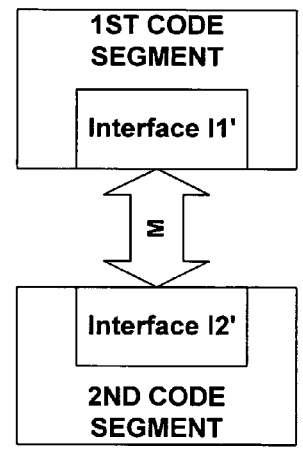
FIGURE C2
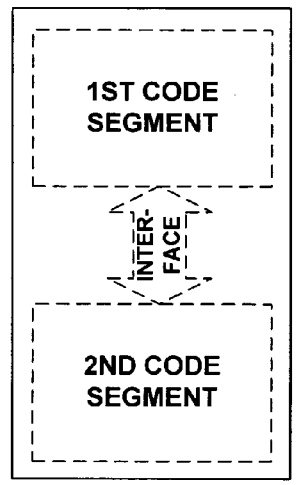
FIGURE D1
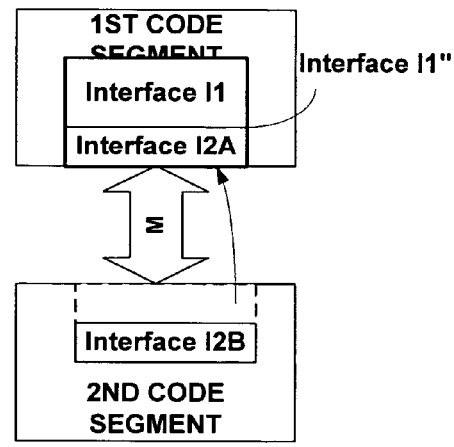
FIGURE D2

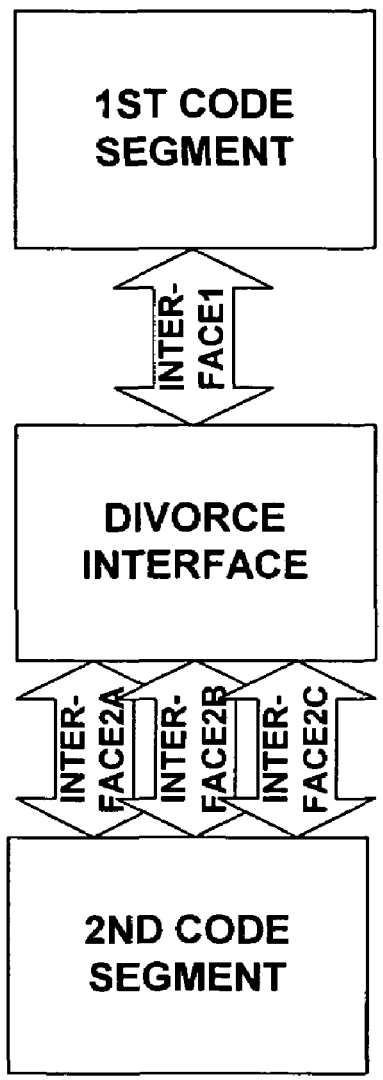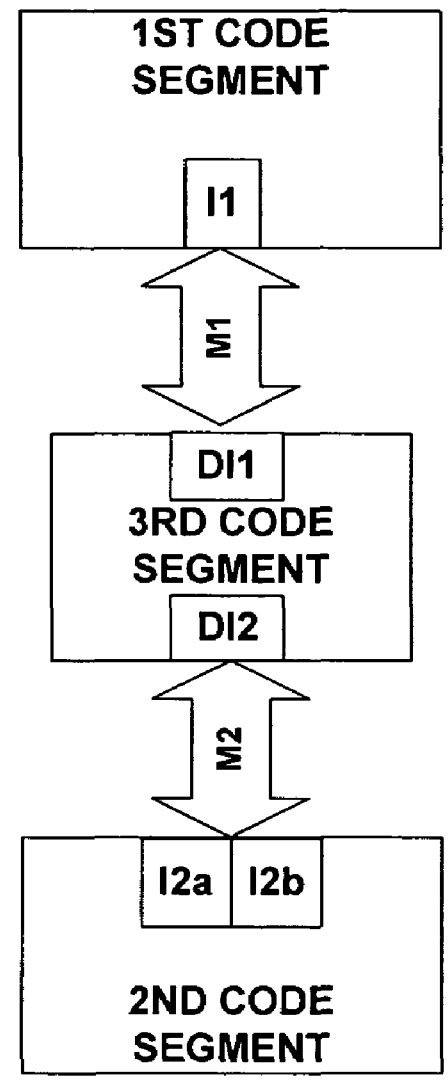
FIGURE E1
FIGURE E2

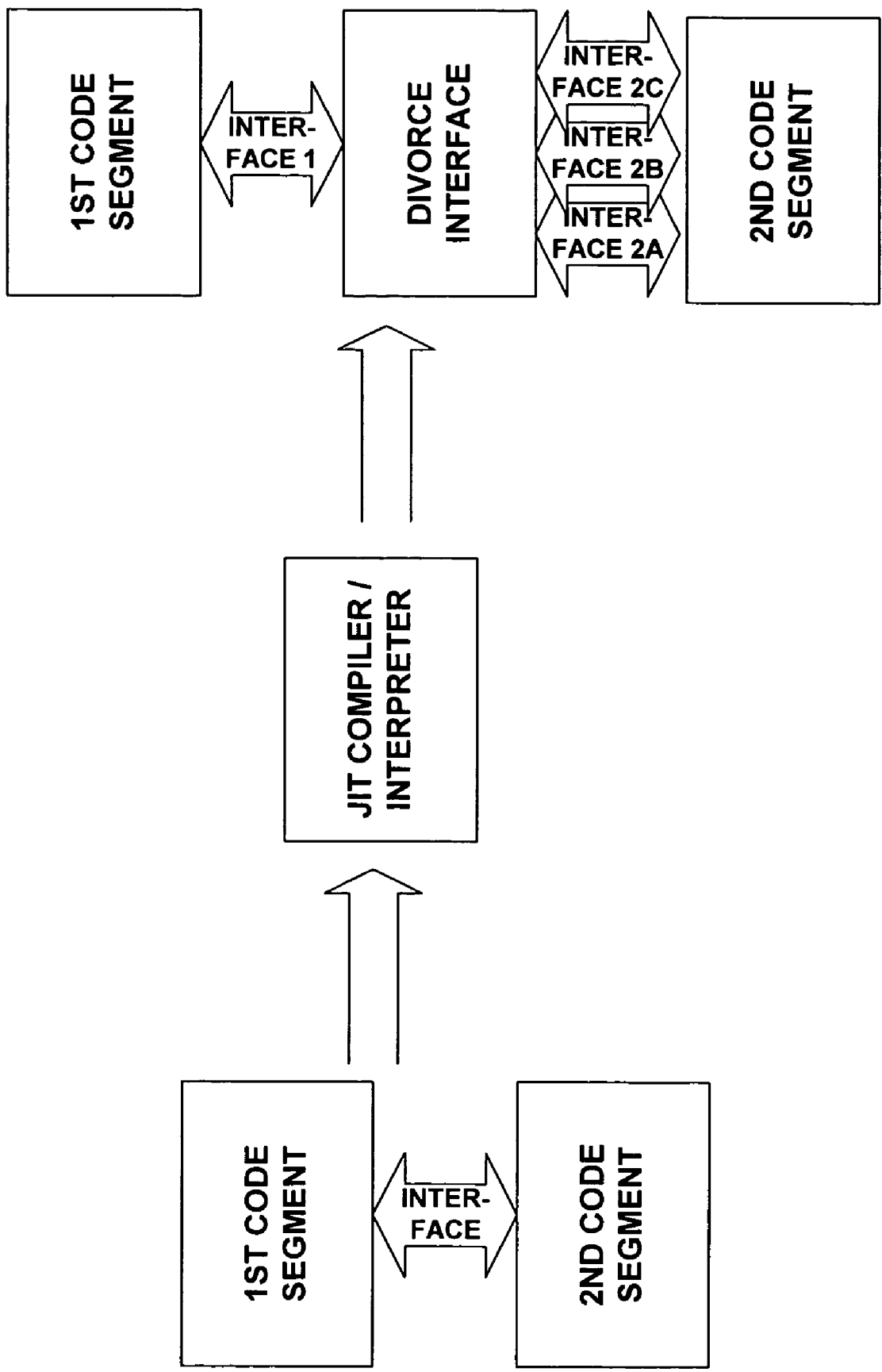
FIGURE F1

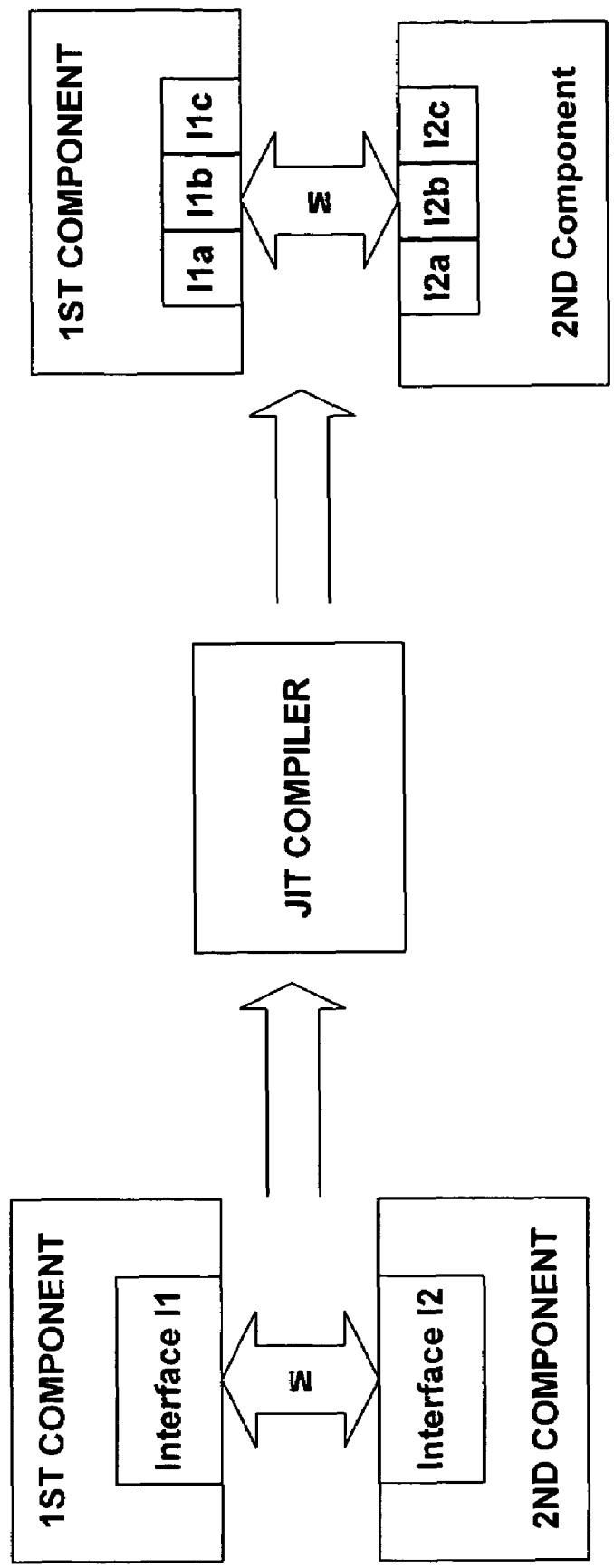
FIGURE F2

SYSTEMS AND METHODS FOR PAGINATION AND CO-PAGINATION

FIELD OF THE INVENTION

This invention pertains generally to the fields of computer software development and view layout, and, more particularly, to the management of pagination within software applications.

BACKGROUND OF THE INVENTION

A feature of many modern computer software applications is the ability to determine break points for the presentation of output. Existing applications that support printing, such as MICROSOFT WORD 2000 by the MICROSOFT CORPORATION of Redmond, Wash., for example, include pagination routines for determining where page breaks should occur. Pagination is the process by which more than one page worth of data is broken up into portions that will each fit on a single page. The techniques of pagination are similarly employed when displaying output to a monitor, or other types of output devices, particularly when the output device is limited to displaying a fixed, finite amount of output at a given time, or when multiple views are presented simultaneously, such as a 2-column view of text.

Many modern computer software applications further have the ability to embed different types of objects within each other. For example, in MICROSOFT WORD 2000, a user may embed a graphical table, graphical drawing, or other graphical object within the context of a word processing document. When documents containing embedded graphical objects are paginated, problems may arise if a page break falls across an embedded graphical object. The embedded objects may not be "co-paginated." That is, unless pagination has been specifically defined for the embedded graphical object's type in the context of the particular application, the embedded graphical object will either not be allowed to break across the page, or will exhibit unpredictable results. Although some existing applications contemplate embedding and pagination for particular object types—such as MICROSOFT WORD allowing embedded tables to break across pages—there does not exist a general, extensible way in which an application can allow co-pagination with arbitrary object types.

BRIEF SUMMARY OF THE INVENTION

Embodiments of the present invention provide methods and systems for management of pagination within software applications.

In accordance with one aspect of the invention, a system is provided for controlling pagination of a presentable object in a computer application, the system comprising a set of user-definable classes for representing pages on which the presentable object is paginated, and a set of user-definable methods utilizing the user-definable classes to paginate the object.

In some embodiments, the set of user-definable classes comprises a first class for representing display information of a page, a second class for representing descriptive information of a page, a third class for representing page break information, and a fourth class for representing positional information of content.

In some embodiments, the set of user-definable methods comprises a method for measuring the object for pagination, and a method for arranging paginated pages of the object for display.

In some embodiments, the set of user-definable methods further comprises a method for updating the pagination of an object.

In some embodiments, the set of user-definable methods further comprises a method for calculating page break positions for an object to be paginated.

In some embodiments, the set of user-definable methods further comprises a method for setting a host of the object.

In accordance with another aspect of the invention, a system is provided for hosting a paginating control for an object in a computer application, the system comprising a set of user-definable classes for representing pages on which the object is paginated, and a set of user-definable methods utilizing the user-definable classes to interact with the paginating control.

In some embodiments, the set of user-definable classes comprises a first class for representing display information of a page, a second class for representing descriptive information of a page, a third class for representing page break information, and a fourth class for representing positional information of content.

In some embodiments, the set of user-definable methods comprises a first method for receiving notification that content in the object has changed.

In some embodiments, the first method includes a start position and an end position between which content in the object has changed.

In some embodiments, the set of user-definable methods further comprises a method for receiving notification that content in the object requires a different page size.

In accordance with another aspect of the invention, a system is provided for controlling pagination of, and hosting paginating controls for, objects in a computer application, the system comprising a set of user-definable classes for representing pages on which objects are paginated, a set of user-definable methods utilizing the user-definable classes to paginate objects, and a set of user-definable methods utilizing the user-definable classes to interact with paginating controls.

In some embodiments, the set of user-definable classes comprises a first class for representing display information of a page, a second class for representing descriptive information of a page, a third class for representing page break information, and a fourth class for representing positional information of content.

In accordance with another aspect of the invention, a method is provided for formatting a page for presentation in a computer system, the method comprising receiving a size parameter, receiving a page descriptor parameter, and causing a page measuring function to provide a formatted page, using the size parameter and page descriptor parameter. In some embodiments, the page descriptor parameter comprises page break information.

In accordance with another aspect of the invention, a method is provided for arranging a page for presentation in a computer system, the method comprising receiving a page parameter, receiving a size parameter, and causing a page arranging function to arrange the page for presentation, using the page parameter and the size parameter.

In accordance with another aspect of the invention, a method is provided for calculating page break information for a page in a computer system, the method comprising receiving a size parameter, receiving a page descriptor parameter, and causing a page break calculating function to provide a page break information parameter, using the size parameter and page descriptor parameter.

In accordance with another aspect of the invention, a method is provided for notifying that a page requires formatting for presentation in a computer system, the method comprising receiving a child element parameter representing the page, and causing a notification function to notify a host element of the child element's need to be formatted, using the child element parameter. In some embodiments, the method further comprises receiving a start position parameter, and receiving an end position parameter.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIGS. 2a-2c illustrate an example of content being paginated onto two pages, in accordance with an embodiment of the invention.

FIG. 3 illustrates a representation of co-paginating objects, in accordance with an embodiment of the invention.

FIG. 8 is an example of a computer source code model for methods used by a host control, in accordance with an embodiment of the invention.

FIG. 9 is an example of a computer source code model for methods used by a paginating control, in accordance with an embodiment of the invention.

FIGS. 10a-10b are examples of computer source code models for classes used in preparing pages for presentation, in accordance with an embodiment of the invention.

FIGS. 11a-11b are examples of computer source code models for classes used in preparing pages for presentation, in accordance with an embodiment of the invention.

FIGS. A1 and A2 illustrate a generic programming interface, in accordance with an embodiment of the invention.

FIGS. B1 and B2 illustrate the factoring of communications between code segments, in accordance with an embodiment of the invention.

FIGS. C1 and C2 illustrate redefinition of a programming interface, in accordance with an embodiment of the invention.

FIGS. D1 and D2 illustrate changing the form of a programming interface due to merger of functionality of code segments, in accordance with an embodiment of the invention.

FIGS. E1 and E2 illustrate breaking communication between code segments into multiple discrete communications, in accordance with an embodiment of the invention.

FIGS. F1 and F2 illustrate the dynamic rewriting of code, in accordance with an embodiment of the invention.

DETAILED DESCRIPTION OF THE INVENTION

The methods and systems to improve the ease with which developers can create applications that allow for co-pagination with arbitrary object types, and can create arbitrary object types that can co-paginate with arbitrary applications will now be described with respect to preferred embodiments; however, the methods and systems of the present invention are not limited to software development tools and computer operating systems. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
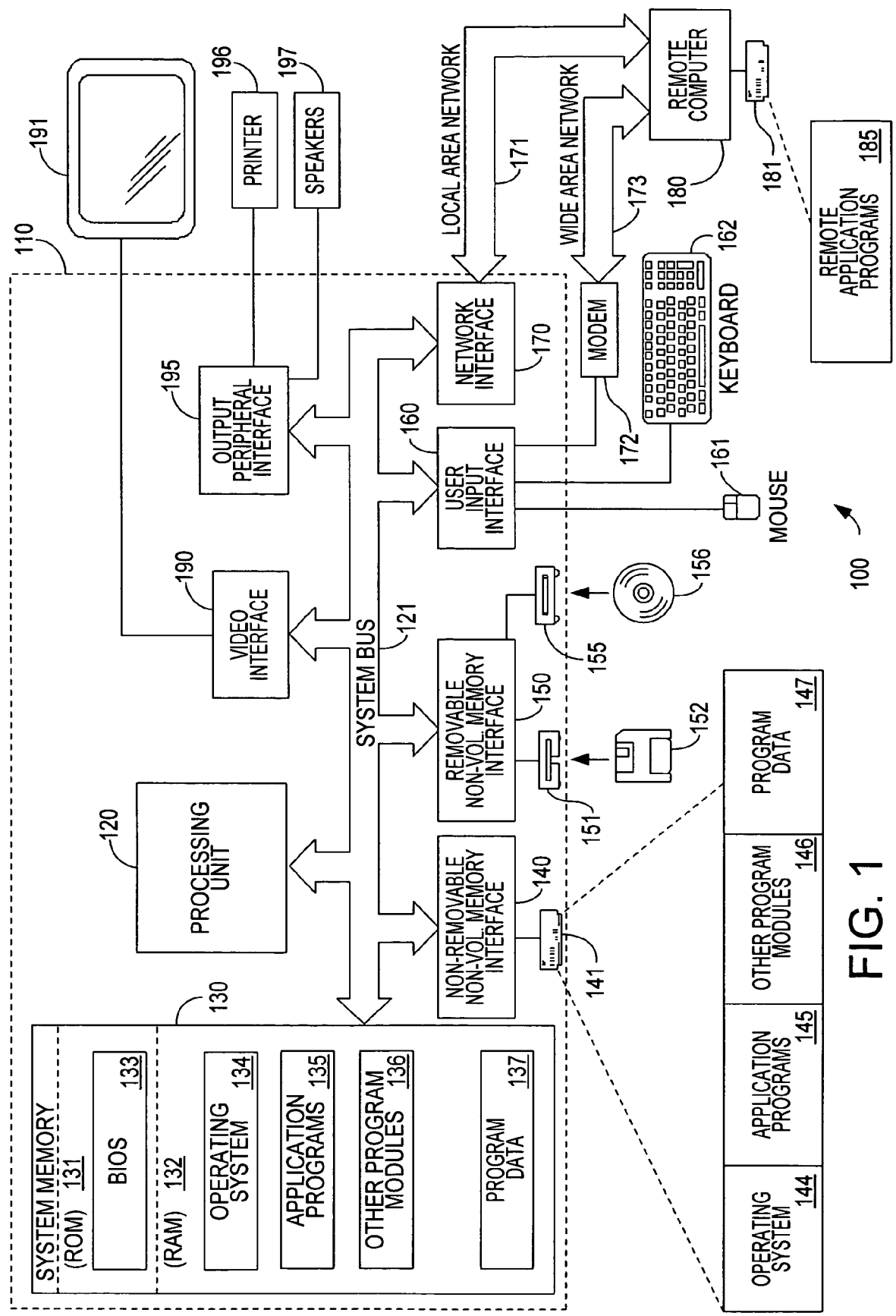
FIG. 1 is a simplified schematic illustrating an exemplary architecture of a computing device for carrying out preparation of pages for presentation in accordance with an embodiment of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIGS. 2*a-c* illustrates a simple example of pagination in general. Object 202 contains text that is to be displayed on an output device, such as a monitor or printer. The output device is only capable of displaying a fixed amount of output, as indicated by the rectangle 204. The text is therefore paginated into two pages, page 206 and page 208. The rules by which the text is paginated often vary by implementation. Some implementations paginate by making sure only that no single word breaks across pages. Others paginate by making sure no sentence breaks across pages. Others paginate by making sure no paragraph breaks across pages. Still others paginate while accounting for 'orphans' (a page ends with the first line of a new paragraph) and 'widows' (a page begins with the last line of a paragraph).

Pagination is not limited to text, however. FIG. 3 illustrates an instance of pagination with multiple types of embedded objects, in accordance with an embodiment of the invention. The objects to be displayed and paginated are logically represented in a tree 302. Objects may be called "parents" and "children" according to their natural hierarchical relation to other elements. The root 304 of the tree represents the top-level object, for example, a document 305. Node 306 represents a block of text 307. Node 308 represents a table 309 embedded in the document 305. The rows 310 are represented by nodes 312, 314, 316 and 318 in the tree 302. The third row 320, represented by node 316, contains three cells 322, 323 and 324, represented by nodes 325, 326 and 327. The first cell 322, represented by node 325, is empty. The second cell 323, represented by node 326, contains a graphic image 330. The third cell 324, represented by node 327, contains a block of text 332. If the output device is of a fixed size that is smaller than the content to be displayed, then the document must be broken into pages, each page capable of being displayed by the output device. One possible pagination of the document breaks into two pages, page 0 334 and page 1 336. In this example, the page breaks across the document 305, the table 309, the third row 320, cells 322, 323 and 324, the image 330 in the second cell 323, and the text 332 in the third cell 324. This particular result may not be desirable for numerous reasons. It may be desirable for the table 309 to appear fully on one page. It may be desirable for the third row 320 to appear fully on one page. It may be desirable for a particular cell to appear fully on one page. It may be desirable for the contents of a cell, such as the image 330, to appear fully on one page.

In accordance with an embodiment of the invention, specified abstract classes and interfaces of methods allow developers to define pagination rules for objects. The classes and methods allow an object to be a paginating control element or a host control element. A paginating control element uses the classes and methods to determine how it should break across pages in the context of its host. A host control element uses the classes and methods to provide a context in which paginating control elements exist, such as when display objects are embedded within other display objects. The host control element further uses the classes and methods to allow its pages to be rendered to an output device. The host control element further uses the classes and methods to manage the pagination process. In this way, the abstract classes and interfaces provided in an embodiment of the invention are divorced from the type of content that flows across pages.

Figure 4:
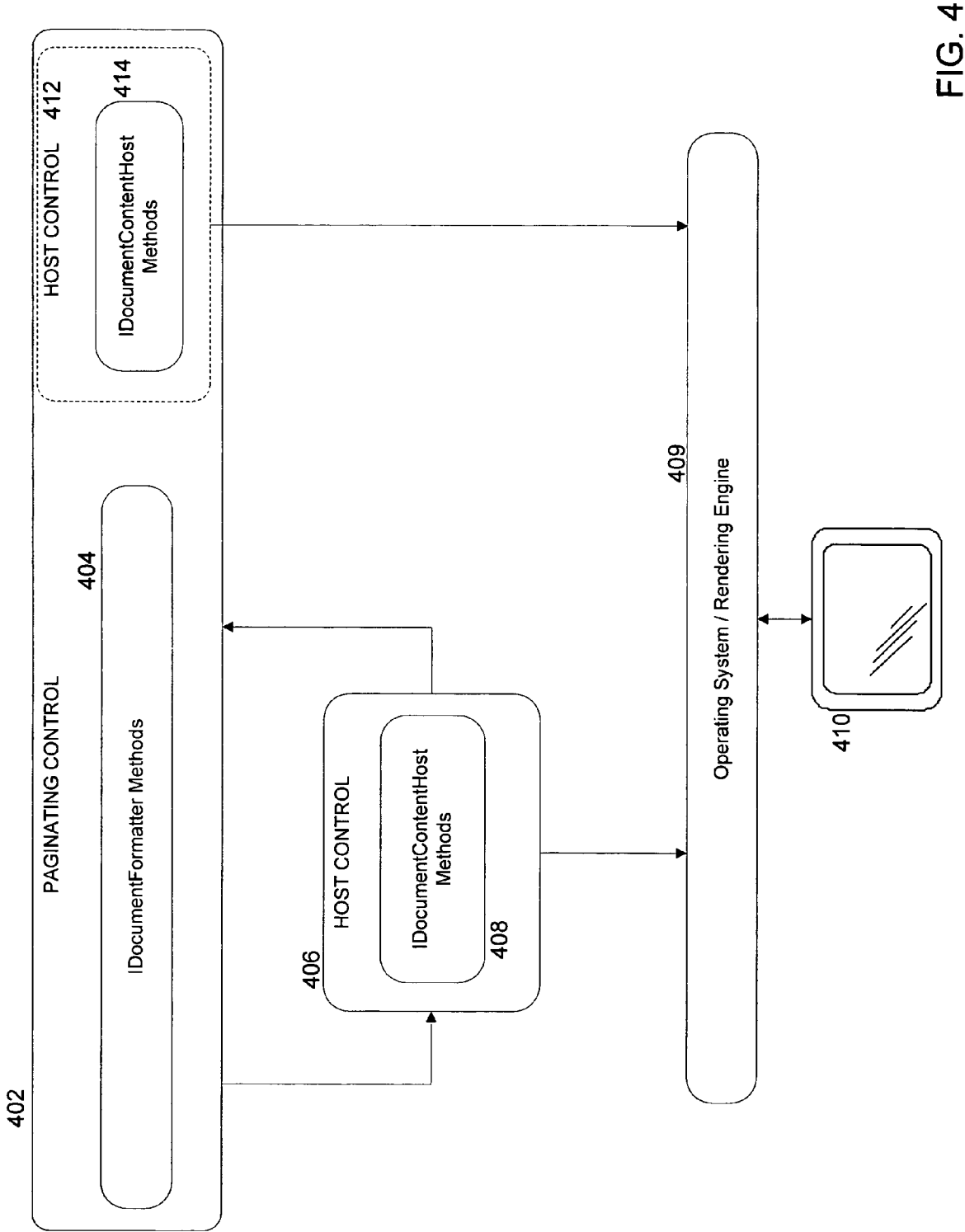
FIG. 4 is a simplified schematic drawing illustrating at a high level an exemplary architecture for preparing pages for presentation, in accordance with an embodiment of the invention.

The general architecture for the pagination portion of a presentation system in an embodiment of the invention, is shown in FIG. 4. Object 402 is a paginating control element and thus has access to various page management methods via an IDocumentFormatter interface 404. A more detailed discussion of these methods appears below. Object 402 is hosted by a host control element 406. The host control element 406 has access to various page management methods via an IDocumentContentHost interface 408, which are discussed in more detail below. Host control element 406 interacts with paginating control element 402 to manage pagination for paginating control element 402. Host control element 406 further interacts with the operating system 409 to render pages to an output device 410. In this example, object 402 also includes a host control element 412. Object 402, therefore, has access to the various page management methods via an IDocumentContentHost interface 414 and can host other paginating control elements.

FIGS. 5*a-f* illustrate the various classes and methods used in an embodiment of the invention. A DocumentPage class 502 represents view-related data of a bottomless or finite page. Each paginating control element creates its own customized DocumentPage, which potentially exposes additional interfaces that can perform specialized functions, such as investigating page structure. In a bottomless scenario, a paginating control element creates one DocumentPage object representing the entire control element's content. In a paginated scenario, a new DocumentPage is created for each page. The DocumentPage class comprises five members: Owner property 504, DesiredSize property 506, ComputedSize property 508, BreakRecordOut property 510 and RenderEnt property 511. The Owner property 504 is a pointer back to the element that owns the page. The DesiredSize 506 is the size that the page would like to assume, barring any external constraints. The ComputedSize 508 is the size that the page will assume, and is computed by an ArrangePage method described below. The BreakRecordOut 510 indicates the break position of the page. It is set to null if the page is bottomless, or if it is the last page. BreakRecords are described in more detail below. RenderEnt 511 is a renderable entity, which is specific to the particular implementation being used. The RenderEnt 511 is the functional link between the abstract classes and methods of the invention and any specific embodiment.

In an embodiment of the invention, a PageDescriptor class 512 provides input information required to format a page. The PageDescriptor class 512 comprises two members: a PageSize property 514 and BreakRecordin 516. The PageSize member 514 represents the size of the page. The BreakRecordin 516 is the BreakRecordOut 510 of the previous page, which is used to continue page formatting. For the first page of the document, BreakRecordIn 516 is NULL. In an embodiment of the invention, the PageDescriptor class is a sealed class.

In an embodiment of the invention, a BreakRecord class 518 stores information about where pages break during pagination. Each type of paginating control element provides its own customized BreakRecord class. The customized BreakRecord classes are derived from the general BreakRecord class 518. For example, a TableBreakRecord class, RowBreakRecord class and CellBreakRecord class are used in paginating table objects, such as table 309 in FIG. 3. A TableBreakRecord contains an array of RowBreakRecords, a RowBreakRecord contains an array of CellBreakRecords, etc. In this way, a single BreakRecord potentially contains other BreakRecords internally. The general BreakRecord class 518 comprises two members: a BreakPosition property 520 and an IsInvalid function 522. The BreakPosition 520 represents where a page breaks. More specifically, the BreakPosition 520 indicates where the previous page ends. For example, if a text document contains 100 characters and 60 characters are placed on the first page while 40 characters are placed on the second page, then the BreakPosition for the second page equals 60. If 30 characters are placed on the first page, 40 on the second page, and 30 on the third page, then the BreakPosition for the third page equals 70. The IsInvalid function 522 is used in conjunction with a host control element to determine if a page is invalid for a content change. A host control element calls IsInvalid for a BreakRecord, passing in start and end positions of a content change. If the content change affects the BreakRecord, IsInvalid returns TRUE. Otherwise, it returns FALSE.

In an embodiment of the invention, a ContentPosition class 524 specifies positions within a given content type. Each type of paginating control element provides its own content position class based on the ContentPosition class 524, specific to its content. For example, in a text element, a ContentPosition object represents a character position. In a JPEG image, ContentPosition represents a scanline. In a table, ContentPosition represents a row. Other representations for ContentPosition are possible, due to the abstraction of the ContentPosition class 524. The ContentPosition class 524 comprises one member: an IsComparableTo function 526. The IsComparableTo function 526 is used to determine if two ContentPositions may be compared, via equal, greater than, less than, or other comparing functions. For example, if ContentPosition is defined in one paginating control element as a scanline of a JPEG while another ContentPosition is defined in another paginating control element as a number of characters, then these two ContentPositions are not comparable and the IsComparableTo function 526 returns FALSE. If the two types of ContentPositions are comparable, the IsComparableTo function 526 returns TRUE.

Figure 5A:
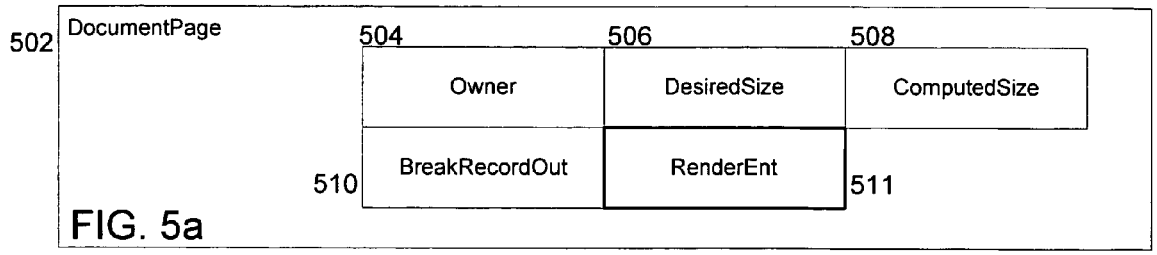
FIGS. 5a-5f illustrate classes, methods and interfaces used in preparing pages for presentation, in accordance with an embodiment of the invention.
Figure 5B:
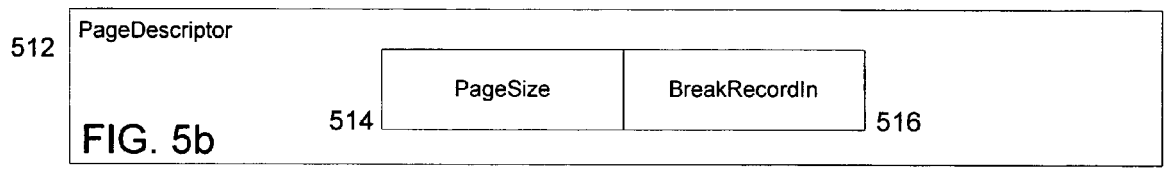
Figure 5C:
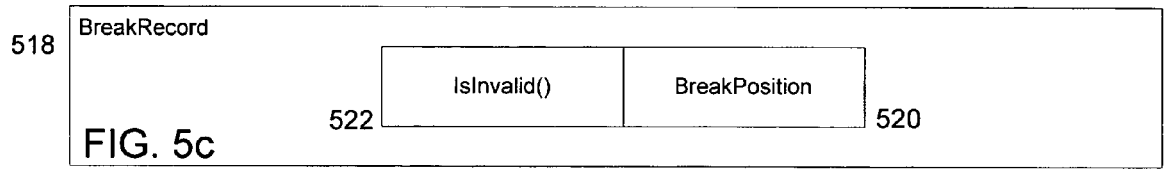
Figure 5D:
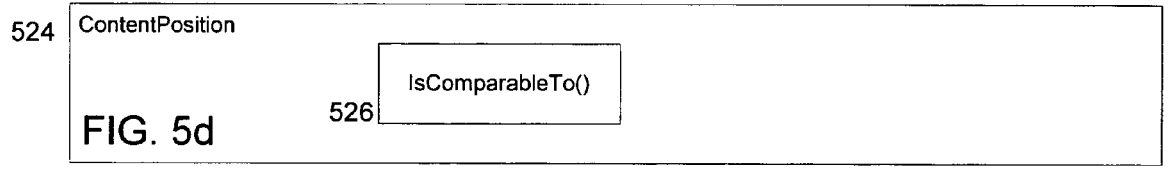
Figure 5E:
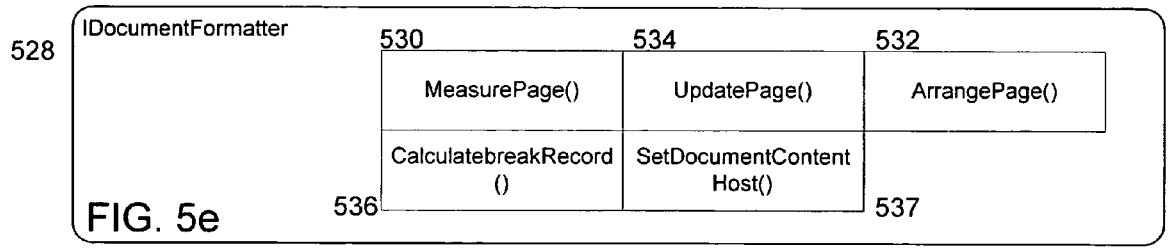

The IDocumentFormatter interface 528 is now described with respect to FIG. 5e, in accordance with an embodiment of the invention. The IDocumentFormatter interface 528 is implemented by paginating control elements to support pagination and other document features, such as footnotes. The IDocumentFormatter interface 528 comprises five methods: a MeasurePage method 530, an ArrangePage method 532, an UpdatePage method 534, a CalculateBreakRecord method 536 and a SetDocumentContentHost method 537. The methods of the IDocumentFormatter interface 528 are described with greater detail below.

Figure 5F:
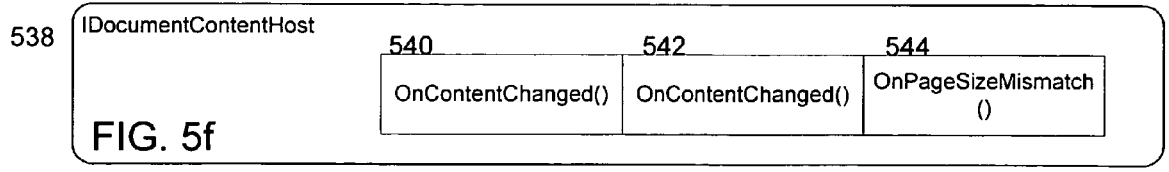

The IDocumentContentHost interface 538 is now described with respect to FIG. 5f, in accordance with an embodiment of the invention. The IDocumentContentHost interface 538 is implemented by host control elements to allow the hosting of paginating control elements that use the IDocumentFormatter interface 528. The IDocumentContentHost interface 538 comprises three methods: a first OnContentChanged method 540, a second OnContentChanged method 542, and an OnPageSizeMismatch method 544. The methods of the IDocumentContentHost interface 538 are described with greater detail below.

Turning to FIGS. 6a-e, the methods associated with the IDocumentFormatter interface 528 are now described, in accordance with an embodiment of the invention. The MeasurePage method 530 is shown as a flow diagram in FIG. 6a. MeasurePage 530 is called by a parent element to create and format a new document page. It takes two inputs: a constraint and a pageDescriptor. The constraint is the size of the parent's current page available for content. pageDescriptor is a PageDescriptor, containing current pagination information. pageDescriptor contains a pageSize and a breakrecordIn. The pageSize of pageDescriptor represents the size of the page to be created (e.g., 8.5 by 11 inches, 640 by 480 pixels, etc.). MeasurePage 530 creates and formats a new page of the DocumentPage class, which is returned to the caller of the MeasurePage method 530. The code of the MeasurePage method 530 is written by developers of paginating control elements, to be used in paginating those control elements.

Figure 6A:
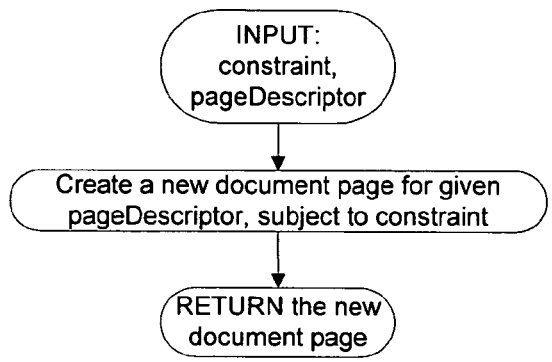
FIGS. 6a-6e are flow diagrams illustrating methods used in preparing pages for presentation, in accordance with an embodiment of the invention.
Figure 6B:
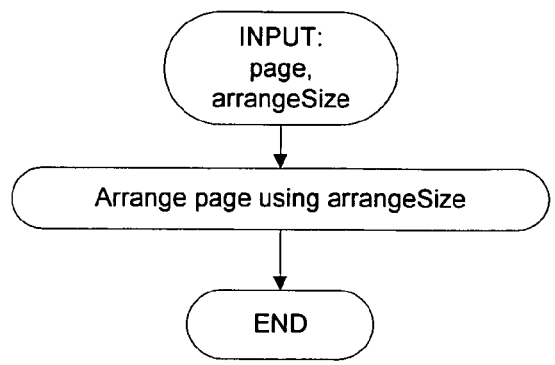

The ArrangePage method 532, shown as a flow diagram in FIG. 6b, is now described, in accordance with an embodiment of the invention. The ArrangePage method 532 is used to arrange the content of a page. ArrangePage 532 assumes the page measurements are valid. ArrangePage 532 takes as input a DocumentPage and an arrangeSize, which represents the final size (computed size) of the DocumentPage. It then arranges the content of the DocumentPage subject to the arrangeSize, and exits. The code of the ArrangePage method 532 is written by developers of paginating control elements, to be used in paginating those control elements.

Figure 6C:
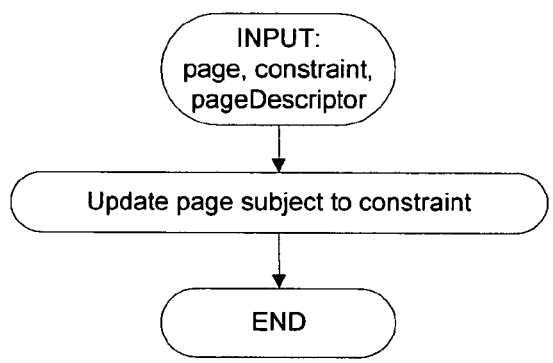
Figure 6D:
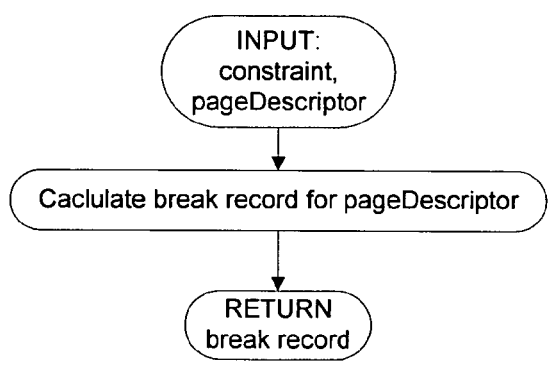

The UpdatePage method 534, shown as a flow diagram in FIG. 6c, is now described, in accordance with an embodiment of the invention. The UpdatePage method 534 is used to incrementally update the layout of content within an existing page. It takes as input a DocumentPage, a size constraint, and a pageDescriptor. The UpdatePage method 534 performs a re-layout for that page and exits. This potentially results in a new BreakRecord calculated for the page that was just updated. The code of the UpdatePage method 534 is written by developers of paginating control elements, to be used in paginating those control elements.

Figure 6E:
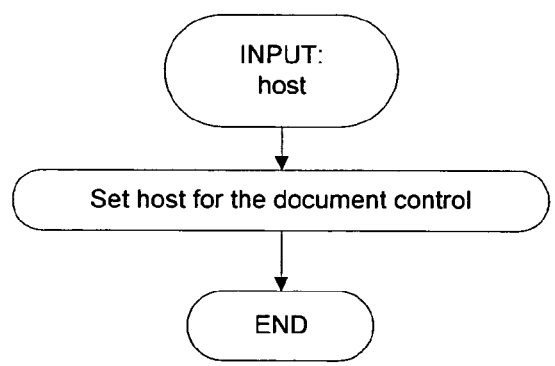

The CalculateBreakRecord method 536, shown as a flow diagram in FIG. 6e, is now described, in accordance with an embodiment of the invention. The CalculateBreakRecord method 536 is used to calculate page breaks in a document without performing the full preparations necessary to display the pages. The CalculateBreakRecord method 536 is used, for example, in scenarios when only the total number of pages and break records of individual pages are required, such as background calculation of all pages. Because no renderable entities are used in CalculateBreakRecord, there is potentially large computational savings by using the CalculateBreakRecord method 536 instead of the MeasurePage method 530. The CalculateBreakRecord method 536 takes as input a size constraint and a pageDescriptor. The CalculateBreakRecord method computes a break record for the pageDescriptor subject to the size constraint. The break record is then returned to the caller of the CalculateBreakRecord method 536. The code of the CalculateBreakRecord method 536 is written by developers of paginating control elements, to be used in paginating those control elements.

The SetDocumentContentHost method 537, shown as a flow diagram in FIG. 6e, is now described, in accordance with an embodiment of the invention. The SetDocumentContentHost method 537 is used to set the host control element for a paginating control element. The host control element is typically the direct parent of the paginating control element. The host control element has implemented the IDocumentContentHost interface 537. By using the SetDocumentContentHost method 537, a paginating control element enables communication with its host regarding content changes and page size mismatches, via methods associated with the IDocumentContentHost interface 538, described below. The SetDocumentContentHost method 537 takes as input a host control element and sets this host control element as the host for the calling paginating control element. The code of the SetDocumentContentHost method 537 is written by developers of paginating control elements, to be used in paginating those control elements.

Figure 7A:
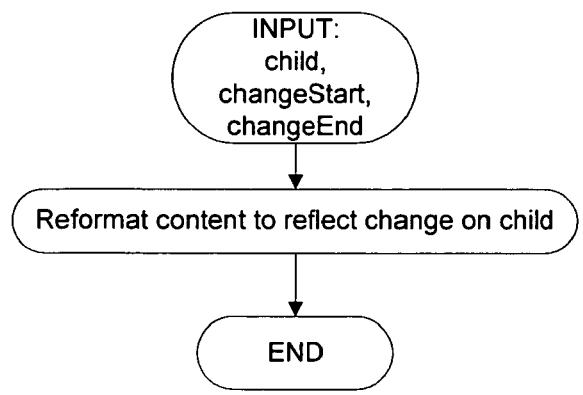
FIGS. 7a-7c are flow diagrams illustrating methods used in hosting objects with pages, in accordance with an embodiment of the invention.
Figure 7B:
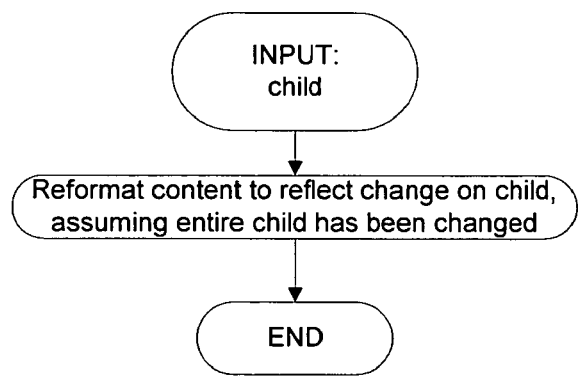
Figure 7C:
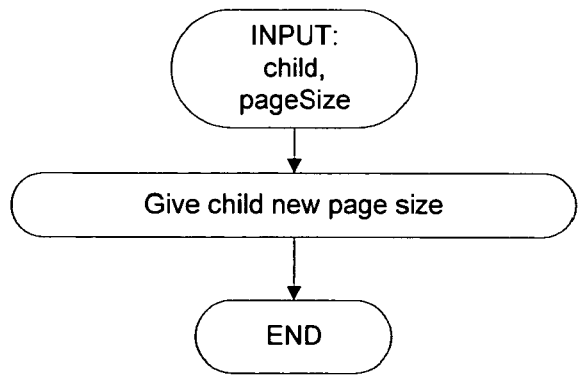

Turning to FIGS. 7a-c, the methods associated with the IDocumentContentHost interface 538 are now described, in accordance with an embodiment of the invention. The first OnContentChanged method 540 is shown as a flow diagram in FIG. 7a. The first OnContentChanged method 540 is called by a child paginating control element on a host control element to notify the host control element that content has changed, and that the host needs to reformat at least part of its content to reflect changes on the child. The first OnContentChanged method 540 takes as input a paginating control child element, a start position and an end position. The first OnContentChanged method 540 notifies the parent-host that the child's content has changed between the start and end positions. An embodiment of the invention keeps an array of break records and, on receiving a change notification via the first OnContentChanged method 540, finds the affected break records and repaginates the corresponding pages via MeasurePage 530 or UpdatePage 534 methods. The code of the first OnContentChanged method 540 is written by developers of host control elements, to be used in managing the pagination of paginating control elements.

The second OnContentChanged method 542, shown as a flow diagram in FIG. 7b, is now described, in accordance with an embodiment of the invention. The second OnContentChanged method 542 is called by a child paginating control element on a host control element to notify the host control element that content has changed, and that the host needs to reformat all of its content to reflect changes on the child. The second OnContentChanged method 542 takes as input a paginating control child element. The second OnContentChanged method 542 notifies the parent-host that the child's content has changed. An embodiment of the invention assumes the entire child needs pagination, and arranges all pages associated with the child. The code of the second OnContentChanged method 542 is written by developers of host control elements, to be used in managing the pagination of paginating control elements.

The OnPageSizeMismatch method 544, shown as a flow diagram in FIG. 7c, is now described, in accordance with an embodiment of the invention. The OnPageSizeMismatch method 544 is called by a child paginating control element on a host control element when content with an explicit page size requirement is not matching the current page size in PageDescriptor. The child requires a new page size. The OnPageSizeMismatch method 544 takes as input a paginating control child element and a pageSize. The OnPageSizeMismatch method 544 notifies the parent-host that the child's page size requirement does not match the current page size. The code of the OnPageSizeMismatch method 544 is written by developers of host control elements, to be used in managing the pagination of paginating control elements.

FIGS. 8-11 illustrate examples of computer source code models guiding developers in writing concrete implementations of the interfaces and classes in an embodiment of the invention. Headers for the IDocumentContentHost interface are shown in FIG. 8. Headers for the IDocumentFormatter interface are shown in FIG. 9. Headers for the DocumentPage class are shown in FIG. 10a, while headers for the PageDescriptor class are shown in FIG. 10b. Headers for the BreakRecord class are shown in FIG. 11a, while headers for the ContentPosition class are shown in FIG. 11b.

Figure 12:
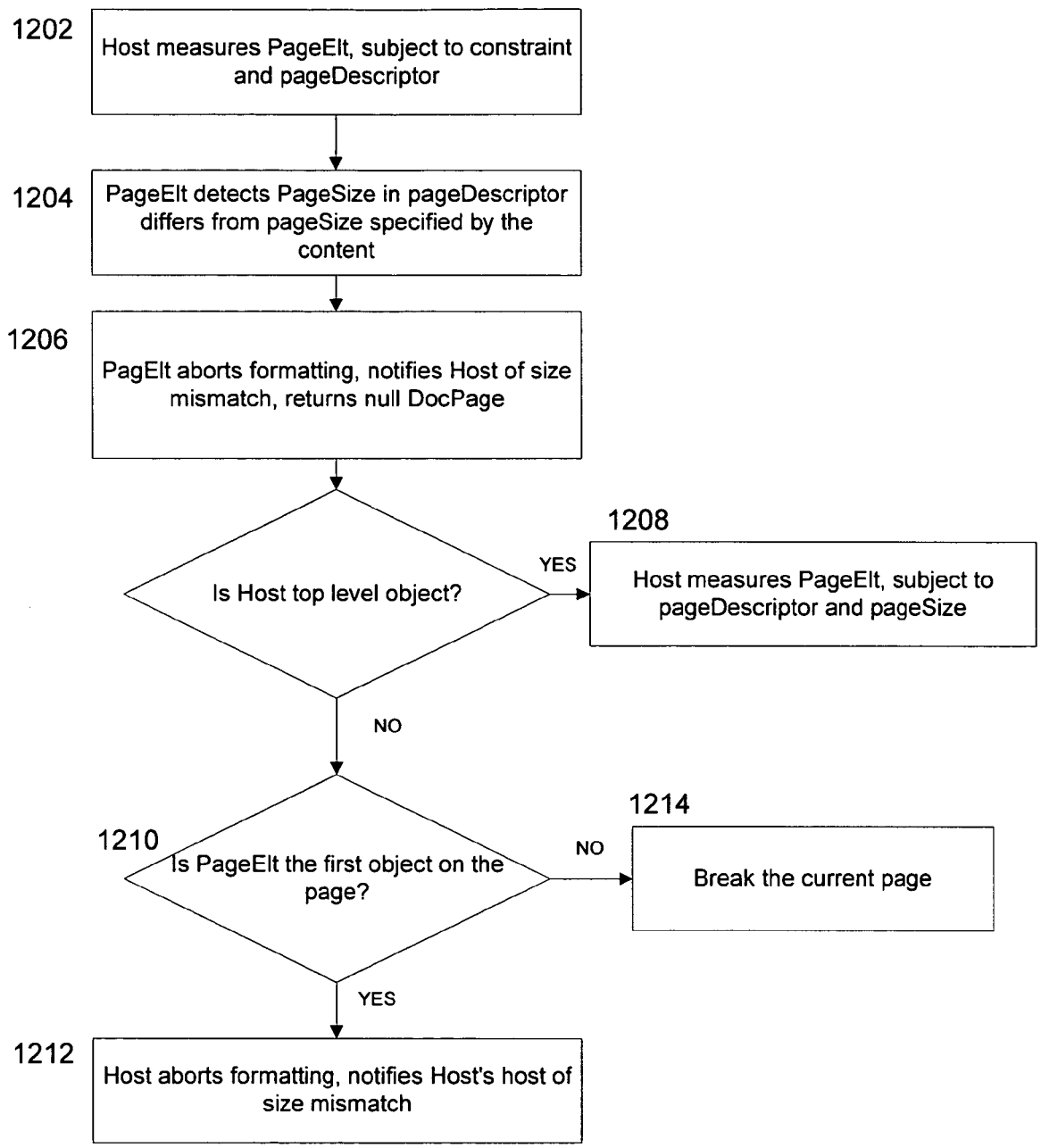
FIG. 12 is a flow diagram illustrating an implementation where page size is driven by content, in accordance with an embodiment of the invention.

FIG. 12 is a flow chart exemplifying a potential use of the OnPageSizeMismatch method 544 during a scenario when page size is requested by content, in one embodiment of the invention. The process begins when a MeasurePage method 530 is called on a child, PageElt, at step 1202. At step 1204, PageElt detects that the PageSize specified in the page descriptor does not match the page size specified by the content. PageElt aborts formatting and notifies its host about the new content driven page size by calling the OnPageSizeMismatch method 544, at step 1206. The MeasurePage method 530 called on PageElt returns a null doc page, which implies a null BreakRecord and RenderEnt. If the host is a top-level object, which is issuing MeasurePage calls, then at step 1208 it restarts measuring the page with the new page size, which was given to the host during the OnPageSizeMismatch method 544 in step 1206. If the host is not a top level object, it is itself a paginating control element, and determines whether the PageElt in question is the first object on the page, at step 1210. If so, the host notifies its host about the page size mismatch by calling the OnPageSizeMismatch method 544, at step 1212. Otherwise, the host breaks the current page at step 1214, which positions PageElt on the following page.

Figure 13:
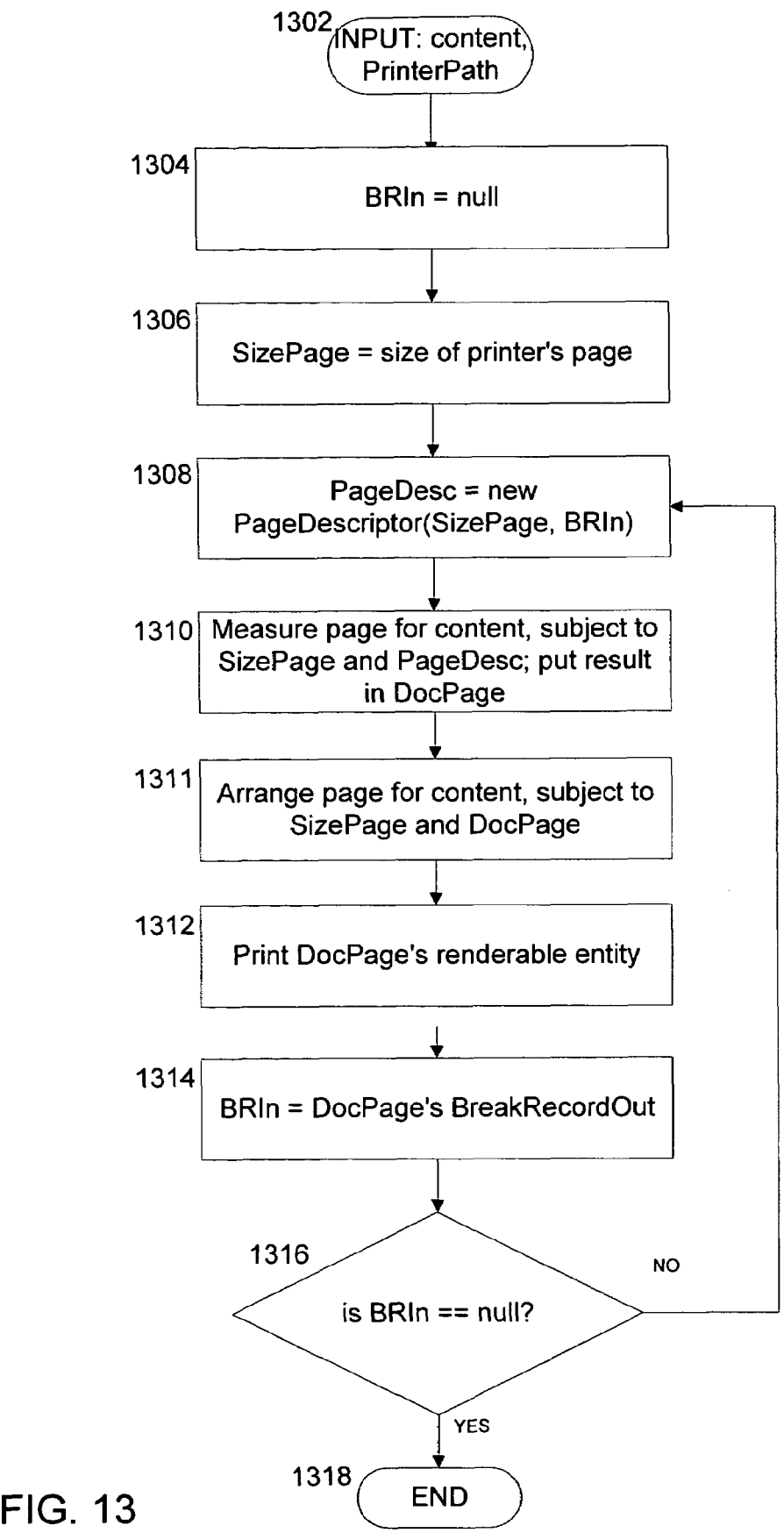
FIG. 13 is a flow diagram illustrating an implementation where pages are presented to a printer, in accordance with an embodiment of the invention.

FIG. 13 is a flow chart exemplifying a potential use of an embodiment of the invention. The flow diagram in FIG. 13 illustrates a procedure for presenting a document to a printer. The procedure takes as input a paginating control host associated with content to be printed, along with a printer path, in step 1302. The break record BRIn is set to null during step 1304. At step 1306, the size of the printer page (e.g., 8.5"×11", A4, etc.) is obtained and stored in a SizePage variable. Next, at step 1308, a new page descriptor, PageDesc, is created using the designated SizePage and BRIn. At step 1310, a document page DocPage is obtained by calling MeasurePage on the content, using SizePage and PageDesc as input. ArrangePage is then called to arrange the content on the page, using the acquired DocPage with arrangeSize=SizePage, at step 1311. DocPage is then printed through its RenderEnt property (see 512 above) at step 1312. The break record BRIn is then updated for the next page by setting it to equal the BreakRecordOut for the current page, at step 1314. The procedure checks if this new BRIn is null at step 1316. If BRIn is null, then all the content has been printed and the procedure stops at step 1318. Otherwise, the printing continues by returning to step 1308 to obtain a new page descriptor for the next page.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Notionally, a programming interface may be viewed generically, as shown in FIG. A1 or FIG. A2. FIG. A1 illustrates an interface Interface1 as a conduit through which first and second code segments communicate. FIG. A2 illustrates an interface as comprising interface objects I1 and I2 (which may or may not be part of the first and second code segments), which enable first and second code segments of a system to communicate via medium M. In the view of FIG. A2, one may consider interface objects I1 and I2 as separate interfaces of the same system and one may also consider that objects I1 and I2 plus medium M comprise the interface. Although FIGS. A1 and A2 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. A1 and A2, but they nonetheless perform a similar function to accomplish the same overall result. We will now briefly describe some illustrative alternative implementations of a programming interface.

A. Factoring

A communication from one code segment to another may be accomplished indirectly by breaking the communication into multiple discrete communications. This is depicted schematically in FIGS. B1 and B2. As shown, some interfaces can be described in terms of divisible sets of functionality. Thus, the interface functionality of FIGS. A1 and A2 may be factored to achieve the same result, just as one may mathematically provide 24, or 2 times 2 time 3 times 2. Accordingly, as illustrated in FIG. B1, the function provided by interface Interface1 may be subdivided to convert the communications of the interface into multiple interfaces Interface1A, Interface 1B, Interface 1C, etc. while achieving the same result. As illustrated in FIG. B2, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. B1 and B2, the functional spirit of interfaces Interface1 and I1 remain the same as with FIGS. A1 and A2, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. C1 and C2. For example, assume interface Interface1 of FIG. A1 includes a function call Square (input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. C1, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. C2, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. A1 and A2 may be converted to the functionality of FIGS. D1 and D2, respectively. In FIG. D1, the previous $1^{st}$ and $2^{nd}$ Code Segments of FIG. A1 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. D2, part (or all) of interface I2 from FIG. A2 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. A2 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. E1 and E2. As shown in FIG. E1, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface 1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. E2, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. A2 to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. F1 and F2. As can be seen in FIG. F1, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. F2, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. A1 and A2. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A system for controlling pagination of a presentable object in a computer application, the system comprising:

a set of user-definable classes for representing pages on which the presentable object is paginated, wherein the set of user-definable classes comprises:~ a first print page-preparation class for representing view-related information of a page, wherein the first class represents at least one of the following: a bottomless and a finite page;

a second print page-preparation class for providing input information regarding page size and a break position for a start position for a current page, wherein the second print page-preparation class is sealed;

a third print page-preparation class for representing page break information associated with a type of break class occur, wherein the third class is customized for an associated pagination control element; and a fourth print page-preparation class for for specifying positions exclusive to a content type, wherein information associated with the fourth class includes pagination control elements for each content type;

an interface for hosting paginating control elements for each content type; and a set of user-definable methods utilizing the user-definable classes to arrange co-pagination of object types.

2. The system of claim 1, wherein the set of user-definable methods comprises:

a method for measuring the object for pagination; and a method for arranging paginated pages of the object for display.

3. The system of claim 2 wherein the set of user-definable methods further comprises:

a method for updating the pagination of an object.

4. The system of claim 2 wherein the set of user-definable methods further comprises:

a method for calculating page break positions for an object to be paginated.

5. The system of claim 2 wherein the set of user-definable methods further comprises:
a method for setting a host of the object.

6. A method for controlling pagination of a presentable object in a computer application, the method comprising:
providing a set of user-definable classes for representing pages on which the presentable object is paginated, wherein the providing the set of user-definable classes further comprises:
providing a first print page-preparation class for representing view-related information of a page, wherein the first class represents at least one of the following:
a bottomless and a finite page;
providing a second print page-preparation class for providing input information regarding page size and a break position for a start position for a current page, wherein the second print page-preparation class is sealed;
providing a third print page-preparation class for representing page break information associated with a type of break class occur, wherein the third class is customized for an associated pagination control element; and
providing a fourth print page-preparation class for specifying positions exclusive to a content type, wherein information associated with the fourth class includes pagination control elements for each content type;
hosting paginating control elements for each content type; and
providing a set of user-definable methods utilizing the user-definable classes to arrange co-pagination of object types.

7. A computer storage medium readable by a computing system mod encoding instructions for executing a computer process for controlling pagination of a presentable object in a computer application, wherein the software application has one or more secured features, said computer process comprising:
providing a set of user-definable classes for representing pages on which the presentable object is paginated, wherein the providing the set of user-definable classes further comprises:
providing a first print page-preparation class for representing view-related information of a page, wherein the first class represents at least one of the following:
a bottomless and a finite page;
providing a second print page-preparation class for providing input information regarding page size and a break position for a start position for a current page, wherein the second print page-preparation class is sealed;
providing a third print page-preparation class for representing page break information associated with a type of break class occur, wherein the third class is customized for an associated pagination control element; and
providing a fourth print page-preparation class for specifying positions exclusive to a content type, wherein information associated with the fourth class includes pagination control elements for each content type;
hosting paginating control elements for each content type; and
providing a set of user-definable methods utilizing the user-definable classes to arrange co-pagination of object types.

* * * * *